(12) United States Patent
Lapeyrouse (10) Patent No.: US 12,077,368 B2
(45) Date of Patent: *Sep. 3, 2024

(54) MULTIPLE COMPONENT CONFECTIONERY DELIVERY PRODUCT AND METHOD FOR DELIVERY

(71) Applicant: Paul J. Lapeyrouse, Marrero, LA (US)

(72) Inventor: Paul J. Lapeyrouse, Marrero, LA (US)

(73) Assignee: FTGC, LLC, Marrero, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,113

(22) Filed: Mar. 24, 2023

(65) Prior Publication Data

US 2023/0234773 A1 Jul. 27, 2023

Related U.S. Application Data (60) Continuation of application No. 17/670,638, filed on Feb. 14, 2022, now Pat. No. 11,639,263, which is a division of application No. 16/289,791, filed on Mar. 1, 2019, now Pat. No. 11,286,103.

(60) Provisional application No. 62/783,859, filed on Dec. 21, 2018.

(51) Int. Cl.
*B65D 85/60* (2006.01)
*B65D 25/10* (2006.01)
*B65D 81/32* (2006.01)

(52) U.S. Cl.
CPC .............. *B65D 85/60* (2013.01); *B65D 25/10* (2013.01); *B65D 81/3205* (2013.01)

(58) Field of Classification Search
CPC ...... B65D 25/10; B65D 85/60; B65D 81/365; B65D 85/06; A23G 3/563
See application file for complete search history.

(56) References Cited

U.S. PATENT DOCUMENTS

| | | | |
|---|---|---|---|
| 1,903,464 A | 4/1933 | Konanz et al. |
| 2,121,185 A | 6/1938 | Claff et al. |
| 3,063,391 A | 11/1962 | Johnston et al. |
| 3,105,612 A | 10/1963 | Krasnoff |
| 3,118,395 A | 1/1964 | Steels et al. |

(Continued)

FOREIGN PATENT DOCUMENTS

| | | |
|---|---|---|
| CN | 2843086 B2 | 12/2006 |
| GB | 2297306 A | 7/1996 |
| WO | 02098764 A1 | 12/2002 |

OTHER PUBLICATIONS

International Search Report and Written Opinion, PCT/US2019/054988, Jan. 2, 2020.

(Continued)

*Primary Examiner* — Ericson M Lachica
(74) *Attorney, Agent, or Firm* — Cahn & Samuels, LLP (57) ABSTRACT

A resealable confectionery product for selective dispensing of a flowable edible liquid confection from a compressible liquid confection chamber through a dispensing aperture integrated into a collar that sealing engages the compressible chamber and establishes a seat for a solid confectionery product where the integrated dispensing aperture is disposed adjacent at least a portion of the solid confectionery product whereupon upon compression of the chamber, liquid confection is dispensed onto the solid confectionery product surface, and a solid confectionery product cover which when engaged with the collar seals the dispensing aperture to prevent further dispensing of the liquid confection.

19 Claims, 3 Drawing Sheets

(56) References Cited

U.S. PATENT DOCUMENTS

| | | |
|---|---|---|
| 3,545,980 A | 12/1970 | Stranger et al. |
| 3,821,425 A | 6/1974 | Russell et al. |
| 4,229,482 A | 10/1980 | Kreske, Jr. et al. |
| 4,278,189 A | 7/1981 | Kirk, Jr. et al. |
| 4,685,597 A | 8/1987 | Hirao et al. |
| 4,902,519 A | 2/1990 | Ream et al. |
| 5,013,321 A | 5/1991 | MacVane et al. |
| 5,161,718 A | 11/1992 | Guerel et al. |
| 5,249,715 A | 10/1993 | Tobler et al. |
| 5,320,260 A | 6/1994 | Song et al. |
| 5,323,933 A | 6/1994 | Brakarz et al. |
| 5,324,527 A | 6/1994 | Coleman et al. |
| 5,370,884 A | 12/1994 | Coleman et al. |
| D359,607 S | 6/1995 | Yun et al. |
| 5,593,065 A | 1/1997 | Harrold et al. |
| 5,706,980 A | 1/1998 | Dickerson et al. |
| D403,579 S | 1/1999 | Gallart et al. |
| 5,993,870 A | 11/1999 | Hoeting et al. |
| D437,219 S | 2/2001 | Gallart et al. |
| 6,187,350 B1 | 2/2001 | Gallart et al. |
| 6,187,352 B1 | 2/2001 | Crosbie et al. |
| 6,221,407 B1 | 4/2001 | Gallart et al. |
| 6,279,233 B1 | 8/2001 | Cameron et al. |
| D450,591 S | 11/2001 | Escola Gallart et al. |
| 6,565,899 B1 | 5/2003 | Cecere et al. |
| 6,660,316 B2 | 12/2003 | Hart et al. |
| 6,730,339 B2 | 5/2004 | Chan et al. |
| 6,811,279 B2 | 11/2004 | Coleman et al. |
| 6,884,447 B2 | 4/2005 | Baker et al. |
| 8,092,847 B2 | 1/2012 | Chan et al. |
| 8,496,983 B2 | 7/2013 | Michaeli et al. |
| 9,694,945 B2 | 7/2017 | Ciecorka et al. |
| D810,390 S | 2/2018 | Lapeyrouse, Jr. |
| 11,286,103 B2 | 3/2022 | Lapeyrouse |
| 2003/0000961 A1 | 1/2003 | Kilma et al. |
| 2003/0082279 A1 | 5/2003 | Chan et al. |
| 2003/0152672 A1 | 8/2003 | Coleman et al. |
| 2003/0206999 A1 | 11/2003 | Coleman et al. |
| 2003/0215549 A1 | 11/2003 | Coleman et al. |
| 2004/0137139 A1 | 7/2004 | Diamond et al. |
| 2004/0262334 A1 | 12/2004 | Green et al. |
| 2006/0040019 A1 | 2/2006 | Cecere et al. |
| 2007/0269560 A1 | 11/2007 | Scott et al. |
| 2008/0206161 A1 | 8/2008 | Tamarkin et al. |
| 2012/0190481 A1 | 7/2012 | Bernard |
| 2015/0096914 A1 | 4/2015 | Kassouni |
| 2016/0143313 A1 | 5/2016 | Clark |
| 2018/0029788 A1 | 2/2018 | Best et al. |

OTHER PUBLICATIONS

European Patent Office, English Abstract for CN2843086Y (B2), printed Sep. 28, 2021.

MULTIPLE COMPONENT CONFECTIONERY DELIVERY PRODUCT AND METHOD FOR DELIVERY

I. FIELD OF THE INVENTION

This invention relates to a novelty confectionery product combining a compressible flavored liquid chamber and a co-aligned solid confectionery food product affixed to a mounting cap that is secured to and covers the liquid chamber, supports the solid confectionery product and incorporates an offset, flavored liquid dispensing nozzle for application of the flavored liquid to the solid confectionery product upon compression of the chamber.

II. BACKGROUND OF THE INVENTION

Novelty candy products that include a plurality of confections have grown in popularity. Confectionery products, packaging, and resulting novel methods of consumption, have evolved to appeal to consumers desiring co-packaged confectionery that incorporates multiple flavors and textures.

U.S. Pat. No. 5,993,870, Hoeting et al., FIGS. 7-10, illustrates a confectionery storing device having a handle and a confection at one end of the handle and a particulate edible coating stored within the device which can be manipulated to bring the particulate edible coating material into contact with the surface of the confection to coat the confection.

U.S. Pat. No. 5,324,527, Coleman, depicts a confectionery dispensing device having a lollipop with apertures mounted on a hollow tubular member through which liquid confectionery stored in a reservoir is dispensed by a lever and plunger mechanism.

U.S. Pat. No. 6,187,350, Gallart et al., describes a hard candy confectionery into which a cavity is formed and a second particulate candy is sealed, wherein the consumer breaks the first hard candy to access the compartment housing the second candy for consumption.

U.S. Pat. No. 6,187,352, Crosbie, illustrates a candy-holding and liquid-dispensing apparatus, wherein the candy is supported on a pivoting candy holder coupled to the reservoir containing the liquid, and the liquid may be sprayed from the liquid reservoir directly into the mouth of the person to provide a cooling effect after consuming the associated hot-flavored candy.

U.S. Pat. No. 6,884,447, Baker, depicts a confectionery product comprising a handle portion, a body portion and a container, with a flowable confectionery disposed therein. The confectionery is shaped with human-like features.

U.S. Pat. No. 6,660,316, Hart et al., describes a two-piece candy housing combining a hard candy mounted on a handle and a cover housing a liquid reservoir with a nipple that can be removed from the hard candy and applied to the candy.

U.S. Pat. No. 6,279,233, Cameron, illustrates a refillable food tank attached to a feeding spoon. The food tank is designed to be used by a caregiver or parent who uses the spoon to feed a disabled person or a young person with underdeveloped motor skills.

U.S. Patent Publication No. 2003/0082279, Chan, depicts an ice cream cone-shaped confectionery product in which the first hard candy is shaped like soft-serve ice cream, and the handle, made to resemble an ice cream cone, is hollow packaging filled with a powder or particulate second confectionery. The consumer shakes the product, protected with a lid, to adhere the interior fluid candy to the exterior surface of the hard candy.

III. SUMMARY OF THE INVENTION

The present application discloses a novel confectionery dispensing product in light of the aforementioned references. Specifically, the present invention features a solid confectionery retaining combination with a compressible liquid chamber housing a fluid confectionery onto which a collar, having integrally formed thereon a nozzle which, upon compression, dispenses liquid onto the outer surface of the solid confectionery.

It is an object of the present invention is to provide a novel confectionery dispensing product having an axially offset dispensing nozzle to the solid confection.

It is a further object of the present invention to provide a novel, unitary confectionery dispensing product that combines a liquid and solid confectionery.

Another object of the present invention is to provide a novel delivery confectionery system to allow for controlled coating of a hard confectionery with a liquid confectionery.

A further object of the present invention is to provide a confectionery dispensing product that is resealable for further use after opening.

Yet another object of the present invention is to provide a confectionery dispensing product having a bottle, collar, nozzle, and confectionery components that are visually and dimensionally customizable.

Still a further object of the present invention is to provide a method for dispensing a liquid confectionery onto a solid confectionery with a multiple component confectionery dispensing product that is used as one unit.

These and other objects are satisfied by a multiple component confectionery delivery product for dispensing a flowable liquid confectionery onto the surface of a solid confectionery, comprising: a hollow elongated base defining at least one compressible liquid confectionery chamber having walls, a closed end, and an open end defined by a neck, said compressible liquid chamber holding a liquid confectionery, said neck extending from the end of the hollow elongated base and having a matingly engageable outer surface, a collared lid having an interior surface dimensioned to sealingly matingly engage with said outer surface of said neck, said collared lid including an exteriorly exposed surface conformed to cover the open end of the base when the collared lid is engaged with said neck, a solid confectionery mounting protruding from the exteriorly exposed surface, and a nozzle integrally formed on and projecting from said exteriorly exposed surface and adjacent to said solid confectionery mounting, said nozzle forming an axial throughway and providing fluid communication with the interior of said compressible liquid confectionery chamber when said collared lid is secured to the neck of the elongated base; a solid confectionery with a base portion and a liquid receiving portion projecting therefrom, said solid confectionery base portion being affixed to said solid confectionery mounting and said liquid receiving portion positioned to receive liquid confection from said nozzle upon compression of said liquid confectionery chamber; a cover sized to encase said solid confectionery liquid receiving portion and sealingly engage with an exterior surface of said collared lid; and a nozzle plug conformed to seal the axial throughway of the nozzle.

Further objects are satisfied by a confectionery product for delivery of a liquid confectionery onto an outer surface of a solid confectionery, comprising: a compressible liquid chamber housing a liquid confectioner, said chamber including an open end defined by a neck having a threaded exterior surface, compressible chamber walls, and a base; a collared lid, having an interior threaded surface to be matably engageable with said exterior surface of said compressible liquid chamber neck, a solid confectionery mounting element defining a first select configuration, and a nozzle to provide fluid communication with the interior of the compressible liquid chamber when the collared lid is engaged with said compressible liquid chamber neck; a solid confectionery with a mounting base and a liquid confection receiving surface, said mounting base dimensionally conforming to said first select configuration to establish an interference fit to said sold confectionery mounting element; a cover dimensioned and conformed to sealably engage with an exterior surface of said collared lid, and overlie the solid confectionery, said cover having formed integrally thereon a plug member conformed for insertion into the nozzle and obstruct fluid communication with the interior of the compressible fluid chamber when the cover is engaged with the collared lid.

The foregoing and still other objects are satisfied by a method for using a multiple component confectionery delivery product for a liquid food product and a solid food where the multiple component confectionery delivery product includes a liquid-confection containing compressible base defining at least a closed end and threaded neck with an open end projecting from the compressible elongated base, a collared lid having a threaded interior surface to sealingly engage with the threaded neck, the collared lid dimensioned to cover the open end of the compressible base when the collared lid is threadingly secured to the neck, the collard lid further defining a protruding solid confectionery mounting and an integrated projecting nozzle adjacent to the solid confectionery mounting member, said nozzle forming an axial throughway and providing fluid communication from the liquid-confection containing compressible base; a solid confectionery affixed to the solid confectionery mounting member with a liquid confection receiving surface portion projecting therefrom proximate to the nozzle; and a cover dimensioned to enclose the solid confectionery upon engagement with the collared lid, said cover including an insertable nozzle plug conformed to seal the axial throughway of the nozzle when said cover is engaged with the collared lid, said method comprising the steps of: disengaging the cover from the collared lid to remove the nozzle plug from the nozzle; compressing the liquid-confection containing compressible base to induce flow of and dispense the liquid confectionery from the base through the nozzle and onto the liquid confection receiving surface portion of the solid confectionery; consuming at least a portion of the solid confection with the liquid confection dispensed thereon; and reengaging the cover with the collared lid to enclose unconsumed solid confectionery and to reinsert the plug into the nozzle.

The invention provides a further embodiment to any one of the previous embodiments characterized in that the nozzle is formed on said exteriorly exposed surface at a location axially offset from the midpoint of said exteriorly exposed surface.

The invention provides a further embodiment to any one of the previous embodiments characterized in that the nozzle incorporates a flow-controlling dispensing valve.

The invention provides a further embodiment to any one of the previous embodiments characterized in that nozzle plug is integrally formed on a surface of the cover.

The invention provides a further embodiment to any one of the previous embodiments characterized in that the nozzle plug is disposed on an interior surface of the cover The invention provides a further embodiment to any one of the previous embodiments characterized in that the solid confectionery and the liquid confectionery chamber are substantially co-aligned along a single vertical axis.

The invention provides a further embodiment to any one of the previous embodiments characterized in the neck and collared lid are matingly engagable by way of a snap fit or coacting threading.

The invention provides a further embodiment to any one of the previous embodiments characterized in that the collared lid further includes a lip projecting from its lower edge dimensioned to abut and be secured to the collared lid by an interference fit.

The invention provides a further embodiment to any one of the previous embodiments characterized in that the cover is tethered with a restraining strap.

The invention provides a further embodiment to any one of the previous embodiments characterized in that the confectionery delivery product represents a three-dimensional characterization of a human, an animal, fictional, or animated character.

The invention provides a further embodiment to any one of the previous embodiments characterized in that an exterior surface of the collared lid is molded to comprise the likeness of a one of a human face, an animal face, a fictional being or a cartoon character.

The invention provides a further embodiment to any one of the previous embodiments characterized in that the cover comprises the likeness of the head of a select character or head covering.

The invention provides a further embodiment to any one of the previous embodiments characterized in that liquid confectionery chamber comprises a body configuration of molded to resemble at least a torso of any one of a human, an animal, a fictional or a cartoon character The invention provides a further embodiment to any one of the previous embodiments characterized in that the solid confectionery is molded to resemble a human tongue.

The invention provides a further embodiment to any one of the previous embodiments characterized in that the exterior surface of the cover is molded or printed with the likeness of a face of any one of a human, an animal, or a cartoon character The present invention relates to a novelty confectionery product combining a flavored liquid confectionery in a compressible chamber and a solid confectionery affixed to a mounting cap which seals the compressible chamber. The invention provides a unique delivery system for liquid confectionery onto a solid confectionery in a solitary unit. Compression of the compressible liquid chamber expels the liquid confectionery onto an adjacent outer surface of the mounted solid confectionery. The product is resealable, enabling the consumer to save some of the product for later consumption if they do not wish to eat it immediately after opening. The improved design aids in minimizing spills. The design enables users of various ages and physical abilities to independently enjoy the confectionery product due to its ease of use.

Particular terminology used herein is for the purpose of describing particular embodiments only and is not intended to be limiting of the invention and is intended to mean the following:

References to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the term "affixed" refers to the attachment of a component of the invention to another component of the invention. For example, the solid confectionery is affixed to the solid confectionery mounting by secure frictional engagement, for example by interference fit. Alternatively, "affixed" can mean permanent attachment to the confectionery mounting by mechanical attachment. Further alternatives include attachment by means including ultrasonic welding or gluing.

As used herein, the term "collar" refers to a component of an embodiment of the invention that engages with the compressible fluid chamber and has integrally formed thereon the nozzle. For example, the component can be a cap collar, screw top closure, snap cap, lid, overlay, seal, crown, cover, top, stopper, etc. In addition to engagement means, the collar may vary in dimension, shape, or size. For example, the collar may be circular, oval, or square, and conformed to engage sealingly with the chamber neck having corresponding dimensions.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

Embodiments of the invention are depicted in FIGS. 1-8 attached hereto. The accompanying illustrations in FIGS. 1-8 depict exemplary embodiments of the invention. It should be understood by those skilled in the art that many modifications and embodiments of the invention will come to mind to which the invention pertains, having benefit of the teaching presented in the foregoing description and associated drawings. It is therefore understood that the invention is not limited to the specific embodiment disclosed herein, and that many modifications and other embodiments of the invention are intended to be included within the scope of the invention. Moreover, although specific terms are employed herein, they are used only in generic and descriptive sense, and not for the purposes of limiting the invention.

Given the following description of the drawings, the inventive multiple component confectionery delivery product should become evident to a person of ordinary skill in the art.

V. DETAILED DESCRIPTION OF THE DRAWINGS

With reference now to the drawings, in particular to FIGS. 1-8 thereof, apparatuses of a multiple component confectionery delivery product, embodying features, principles, and concepts of the multiple component confectionery delivery product invention are described.

Figures 1, 2:
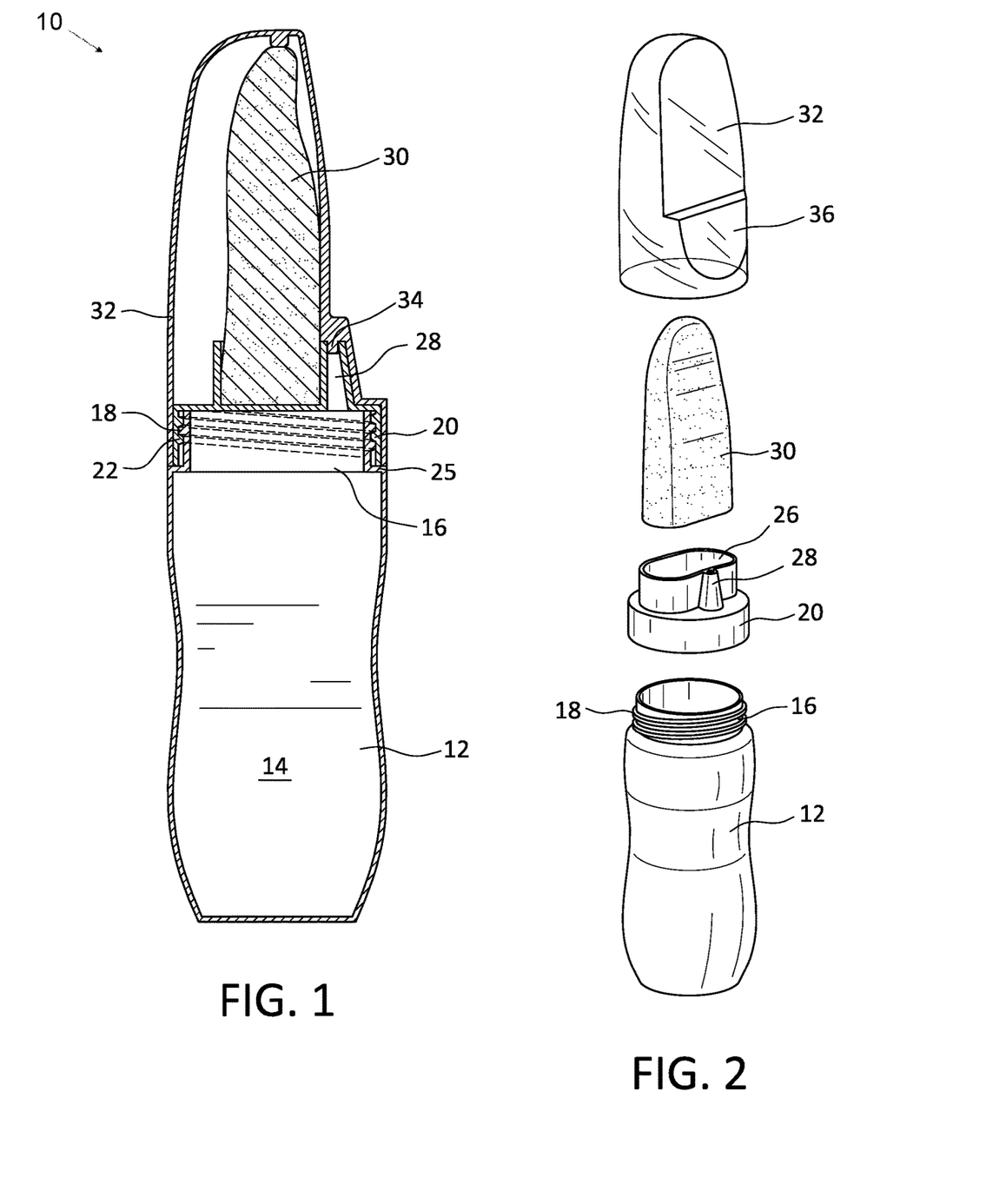
FIG. 1 is a partial cross-sectional cutaway side view of the multiple component confectionery delivery product according to an embodiment of the invention.
FIG. 2 illustrates an exploded perspective view of the multiple component confectionery delivery product according to the FIG. 1 embodiment of the invention

FIG. 1 illustrates an example of a first embodiment of a multiple component confectionery delivery product 10 according to the invention including a hollow elongated base 12 housing a compressible liquid chamber into which a liquid confectionery 14 can be removably housed. The hollow elongated base 12 is molded out of a thin deformable plastic such as polyvinyl chloride (PVC), low-density polyethylene (LDPE), high-density polyethylene (HDPE), polyethylene terephthalate (PET), or any other substance known or used in the art.

A neck 16 projects from the open end of the compressible liquid chamber 12 opposite to its closed end. The neck 16 has a threaded outer surface 18 which engages with a threaded interior surface 22 of a collared lid 20. Threaded engagement creates a pressure resistant seal between the external environment and the compressible liquid chamber inside the hollow elongated base 12 such that compression of the compressible liquid chamber forces the liquid confectionery 14 from within the hollow elongated base 12 out through the axial throughway of the nozzle 28. Alternative to a threaded engagement, the collared lid in certain embodiments may be secured to the neck 16 of the hollow elongated base 12 through any known securing means, such as a snap fit, an interference fit, glue on, or ultrasonic welding. In such an embodiment, the surfaces of the collared lid and the neck would not be threaded, and instead would be equipped with appropriate structures, such as annular projections or recesses to enable a sealing closure.

Integrally formed on the exteriorly exposed surface 24 of the collared lid 20 are a solid confectionery mounting 26 and a nozzle 28. The hard candy mounting 26 comprises a wall onto a portion of which the nozzle 28 is molded. The nozzle 28 has an axial throughway that enables fluid communication with the interior of the compressible liquid chamber when the collared lid 20 is sealably engaged with the neck 16.

The nozzle 28 in certain embodiments is molded to an exterior surface of a wall of the hard candy mounting 26 such that expression of the liquid confectionery 14 from the compressible liquid chamber through the nozzle 28 results in coating of the adjacent exterior surface of a solid confectionery candy 30 that is affixed to the hard candy mounting 26. In an alternative embodiment, the nozzle 28 is formed on the exteriorly exposed surface 24 independently of the wall of the solid confectionery mounting 26 though still located sufficiently proximately on the exteriorly exposed surface 24 to enable discharge of the liquid confectionery 14 onto an adjacent exterior surface of the solid confectionery 30 upon compression of the compressible liquid chamber.

The solid confectionery 30 installed in the solid confectionery mounting 26 can be, for example, a chocolate or a hard candy. The hard candy can be manufactured by any known candy manufacturing method. For example, a low-water content sugar mixture is heated to a sufficient temperature to be formed into a taffy-like consistency, flavoring and coloring is added, and then is run through a roller and cut to make blanks. The blanks are stamped or molded to be formed into the desired product shape. This method of candy-making allows for a virtually unlimited variety in candy shape and configuration.

The solid confectionery 30 is engaged with the solid confectionery mounting 26 in such a fit that it does not become dislodged during the consumption of the product. This can be for example with an interference/friction fit. This requires the solid confectionery 30 which engages with the solid confectionery mounting 26 to occupy the entire area of the mounting, such that the side and base surfaces of the solid confectionery are in a frictional interference contact with the interior surface of the walls of the solid confectionery mounting 26. The solid confectionery 30 in some embodiments of the invention is secured in the mounting 26 while in the cooling/hardening process to enhance bonding to the interior wall surface of the solid confectionery mounting 30 when fully cooled/hardened.

The solid confectionery 30 can be of virtually any shape, size, or configuration. The solid confectionery 30 may be molded to portray a likeness to a celebrity, an animal, or a cartoon character, for example. In some embodiments, due to the secure frictional engagement fit in the solid confectionery mounting 26, the solid confectionery 30 does not require securement to the solid confectionery mounting 26 via pins or nipples.

A cover 32 fits over the solid confectionery 30 to protect it from adverse ambient conditions, including environmental contagions. The cover 32 when secured to the collared lid 20 abuts a lip 25 which establishes a perimetric annulus from the lower end of the collared lid 20. Additionally, the cover 32 features a nozzle plug 34. When the cover 32 is secured by its base fitting securely over the exterior surface of the collared lid 20, the nozzle plug 34 obstructs the axial throughway of the nozzle 28 to prevent further release of the liquid confectionery 14 from the compressible liquid chamber in the hollow elongated base 12. In certain embodiments, the cover 32 is molded to include a nozzle housing 36 dimensioned to fit the height and circumference of the nozzle 28 projecting from the exteriorly exposed surface 24, and which has integrally formed on its interior surface the nozzle plug 34. Alternatively, the cover 32 may enclose only the solid confectionery 30, and a separate nozzle housing may be conformed to fit the nozzle 28 and include on its interior surface the nozzle plug 34. The engagement of the base of the cover 32 with the collared lid 20 can be an interference fit, a threaded fit, a mating interlockable fit, a bayonet joint, or any other fit known or used in the art. The fit should be sufficiently secure to not be disturbed by compression of the compressible liquid chamber, resulting in dislodgement of the nozzle plug 34 and release of the liquid confectionery 14.

The liquid confectionery 14 stored within the compressible liquid chamber can be any flowable fluid confectionery. For example, it may have the consistency of a honey or syrup, or a thicker, gel-like or paste-like consistency. It may be of a thinner liquid consistency, for example the consistency of water or juice. Embodiments of the invention will be suited to adapt to the specific consistency of the liquid confectionery 14. This may involve, for example, the inclusion of a one-way pressure actuated valve, such as a Heimlich valve, within the nozzle 28 to reduce air backflow into the liquid chamber. Alternatively, the valve could be inverted to inhibit the unwanted flow of a low-viscosity liquid from unintentionally escaping from the liquid chamber.

FIG. 2 illustrates in detail an exploded view of a first embodiment of the multiple component confectionery delivery product 10. The hollow elongated base 12 has an open end defined by a neck 16 with a threaded outer surface 18. The solid confectionery 30 in FIG. 2 has the likeness of a tongue, however the solid confectionery may take any form. The solid confectionery mounting 26 should be conformed to fit the dimensions of the lower portion of the solid confectionery 30. The solid confectionery 30 is highly customizable and can be adapted in dimension and appearance to coordinate with the external packaging shape and overall appearance or theme of the product.

Figure 3:
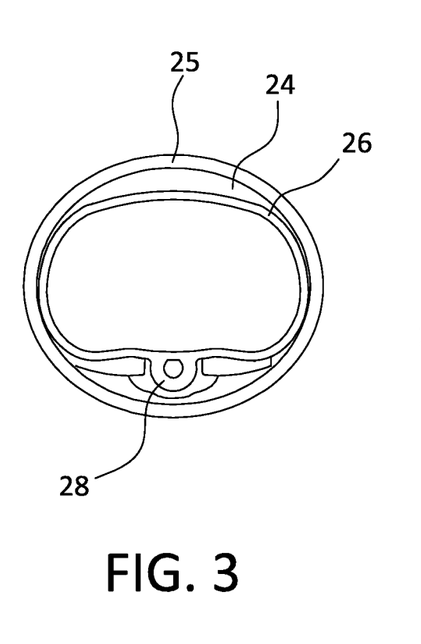
FIG. 3 illustrates a top view of a collar of the multiple component confectionery delivery product according to the FIG. 1 embodiment of the invention.

FIG. 3 illustrates a top view of the collared lid 20, exteriorly exposed surface 24, lip 25, solid confectionery mounting 26, and nozzle 28 according to an embodiment of the invention. The perimeter of the solid confectionery mounting 26 may be indented or fabiform in shape to provide enhanced strength and reliance of the interference fit with the solid confectionery 30. The nozzle 28 and confectionery mounting 26 may be molded to resemble the appearance of a face, for example a human face to coordinate with the tongue-shaped solid confectionery as shown in FIG. 2. In certain embodiments, the exterior of the nozzle 28 may be molded to have the appearance of a nose.

Figure 4:
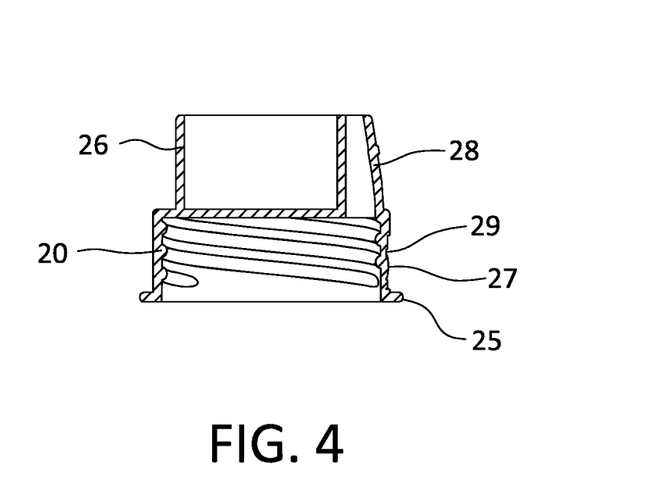
FIG. 4 illustrates a sectional side view of the collar of the multiple component confectionery delivery product according to the FIG. 1 embodiment of the invention.

FIG. 4 illustrates a sectional side view of an embodiment of the invention. The exterior surface of the collared lid 20 may feature projections 27 and recesses 29 as in the embodiment illustrated in FIG. 4 to enable a snap fit engagement between the collared lid 20 and the cover 32 which would have projections and recesses coordinated to fit into the projections and recesses of the exterior surface of the collared lid 20.

FIGS. 5-8 illustrate various views of a second embodiment of the multiple component confectionery delivery product invention wherein the dimensions of the hollow elongated base 12 of the multiple component confectionery delivery product 10 depict a human body dressed in a long coat. This embodiment has a specific vertical orientation consistent with the configuration of the molded character, with the base 12 oriented below and molded to resemble a body, and the cover 32 and collared lid 20 disposed above the molded base 12. In further embodiments, the base 12 may be molded in any desired shape or figure. Further, the collared lid 20 and cover 32 portions may be molded in any desired shape or figure, and may be molded to visually and thematically coordinate with the shape of the base 12.

Figure 5:
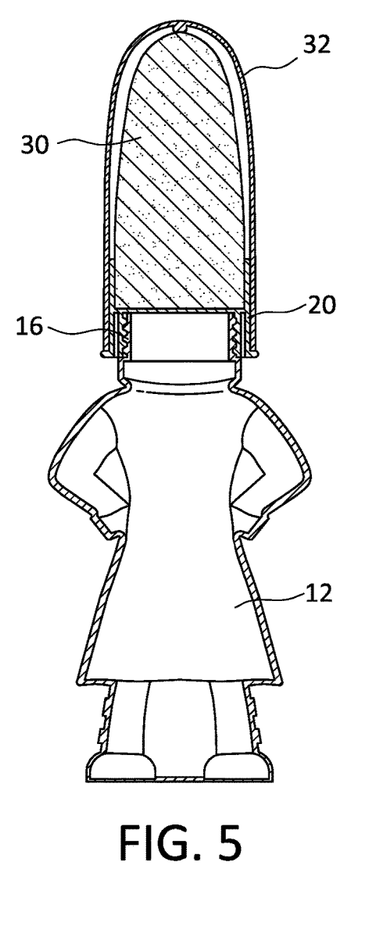
FIG. 5 illustrates a rear view of the multiple component confectionery delivery product according to a second embodiment of the invention.

FIG. 5 illustrates a rear view of a second embodiment showing the back of the base 12. The cover 32 incorporates a nozzle housing 36 such that the cover 32 encloses the entire surface of the exteriorly exposed surface 24. This embodiment includes an alternative lip 25A. The lip 25A is visible projecting perpendicularly from the lower edge of the collared lid 20, against which the bottom of the cover 32 abuts when the cover 32 is affixed to the collared lid 20.

Figure 6:
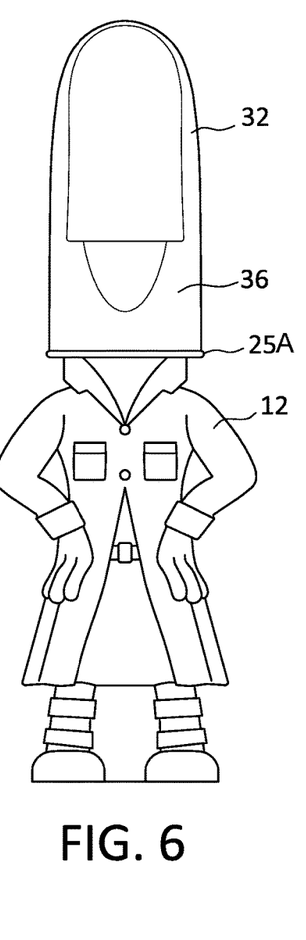
FIG. 6 illustrates a front view of the multiple component confectionery delivery product according to the second embodiment of the invention.
Figure 7:
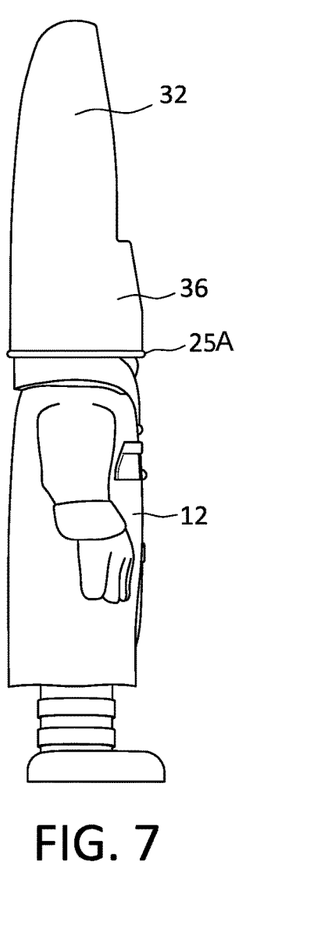
FIG. 7 illustrates a side view of the multiple component confectionery delivery product according to the second embodiment of the invention.

FIG. 6 illustrates a front view of a second embodiment of the invention. The detachable cover 32 is dimensioned to cover the hard candy 30 and may be dimensioned to accommodate the nozzle in the nozzle housing 36 portion. The nozzle housing 36 has a wider diameter than the top of the cover 32 to provide for the width and height dimensions of the nozzle. FIG. 7 more clearly depicts the downward radial expansion from the top of the cover 32 to the nozzle housing 36 and to the cover base, which is dimensioned to fit securely via interference fit over the collared lid 20 abutting against the lip 25A. In an alternative embodiment, the base of the cover 32 may be secured to the exterior of the collared lid 20 via a snap fit engagement, a mating threaded engagement, or a bayonet joint.

Figure 8:
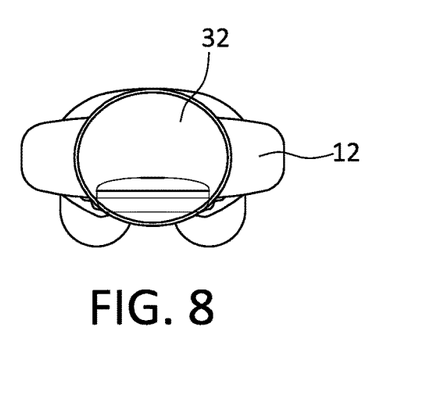
FIG. 8 illustrates a top view of the multiple component confectionery delivery product according to the second embodiment of the invention.

FIG. 8 illustrates a top view of a second embodiment of the multiple component confectionery delivery product including the cover 32, and base 12 molded human body shoulders and shoes. In further embodiments, the base 12 may be molded or shaped to depict any shape or human, animal, or cartoon likeness.

In view of the foregoing description, without departing from the intent of the invention which employs a customized cover and liquid container that conform to the likeness of a celebrity, such as a musician, athlete, or notable public figure. The compact profile of the invention and customizable nature would lend itself to application as a promotional article at ball games, concerts, etc. Once the confectionery contents of the product are consumed or depleted, the remaining product packaging can be converted to a collectible figurine, the collar, chamber, and cover portions of which can be similarly dimensioned and swapped interchangeably for a mix-and-match collection. Younger consumers can collect and swap figurines, encouraging the purchase of all available models for the most complete collection.

In another embodiment, the cover may be tethered to the compressible fluid container or assuming the geometries are appropriate, hingedly affixed to the collared lid.

The foregoing embodiments are examples that are not to meant be limiting of the present invention, variations of which are contemplated to be within the description and/or scope thereof given the foregoing. Those skilled in the art should appreciate that various adaptations and modifications of the example and alternative embodiments described above can be devised without departing from the scope and spirit of the invention. Therefore, it is to be understood that, within the scope of the claims, the invention may be practiced other than as specifically described herein.

The utility of the invention is directed to confectionery product production and enjoyment. The invention provides a new unitary confectionery holder and dispenser that both holds and stores a mounted confectionery product and a deformable container containing an edible fluid; where the fluid is dispensed by user control directly onto the confectionary through an axially offset nozzle to allow the user enjoyment of the combined confection.

VI. PARTS LIST

10—Multiple component confectionery delivery product
12—Hollow elongated base
14—Liquid confectionery
16—Neck
18—Threaded outer surface
20—Collared lid
22—Threaded interior surface
24—Exteriorly exposed surface
25—Lip
25A—Alternative lip
26—Solid confectionery mounting
27—Projection
28—Nozzle
29—Recesses
30—Solid confectionery
32—Cover
34—Nozzle plug
36—Nozzle housing

I claim:

1. A resealable multiple component confectionery delivery product for dispensing a flowable liquid confectionery onto a surface of a solid confectionery, the resealable multiple component confectionary delivery product comprising:

a hollow base defining at least one compressible liquid confectionery chamber having walls, a closed end, and an open end defined by a neck, said at least one compressible liquid chamber holding a liquid confectionery, said neck extending from the open end of the hollow base and having a matingly engageable outer surface, a collared lid having an interior surface dimensioned to sealingly matingly engage with said matingly engagable outer surface of said neck, said collared lid including an exteriorly exposed surface conformed to cover the open end of the hollow base when the collared lid is engaged with said neck, a solid confectionery mounting protruding from the exteriorly exposed surface, and a fixedly positioned integrally formed dispensing aperture on said exteriorly exposed surface and adjacent to said solid confectionery mounting, said dispensing aperture forming throughway providing fluid communication with the interior of said at least one compressible liquid confectionery chamber when said collared lid is secured to the neck of the hollow base;

a solid confectionery with a base portion and a liquid receiving portion projecting therefrom, said solid confectionery base portion being affixed to said solid confectionery mounting and said liquid receiving portion positioned to receive liquid confection from said dispensing aperture upon compression of said at least one compressible liquid confectionery chamber;

a cover sized to encase said liquid receiving portion and sealingly engage with an exterior surface of said collared lid; and a dispensing aperture plug conformed to seal the dispensing aperture where engaging the cover to said collared lid reseals the solid confectionery and dispensing aperture to prevent delivery of said liquid confectionery.

2. The multiple component confectionery delivery product of claim 1, wherein said dispensing aperture is formed on said exteriorly exposed surface at a location axially offset from the midpoint of said exteriorly exposed surface.

3. The multiple component confectionery delivery product of claim 1, said dispensing aperture having a flow-controlling dispensing valve.

4. The multiple component confectionery delivery product of claim 1, wherein said interior surface of said collared lid and said matingly engageable outer surface of said neck are engageable via a threaded fit.

5. The multiple component confectionery delivery product of claim 1, wherein said interior surface of said collared lid and said matingly engageable outer surface of said neck are engageable via a snap fit.

6. The multiple component confectionery delivery product of claim 1, wherein said collared lid further includes a lip projecting from a lower edge of said collared lid to abut a bottom edge of said cover when said cover is attached to said collared lid.

7. The multiple component confectionery delivery product of claim 1, wherein said dispensing aperture plug is integrally formed on a surface of said cover and said cover encloses the entire surface area of said exteriorly exposed surface.

8. The multiple component confectionery delivery product of claim 1, wherein said cover is attachable to said collared lid by an interference fit.

9. The multiple component confectionery delivery product of claim 1, wherein said cover is attachable to said collared lid by an annular snap fit.

10. The multiple component confectionery delivery product of claim 1, wherein said hollow base is elongated, said collared lid and said detachable cover have a substantially cylindrical profile when assembled.

11. The multiple component confectionery delivery product of claim 1, wherein said solid confectionery is affixed to said solid confectionery mounting with an interference fit.

12. The multiple component confectionery delivery product of claim 1, wherein said solid confectionery is molded to resemble a human tongue.

13. The multiple component confectionery delivery product of claim 1, wherein said solid confectionary is a hard candy and said hollow elongated base are substantially co-aligned along a single vertical axis.

14. The multiple component confectionery delivery product of claim 1, wherein said nozzle plug is disposed on an interior surface of said cover.

15. The multiple component confectionery delivery product of claim 1, wherein the hollow base is shaped to resemble any one of a human, an animal, and a cartoon character.

16. The multiple component confectionery delivery product of claim 1 wherein an exterior surface of the collared lid resembles any one of a human face, an animal face, and a cartoon character face.

17. The multiple component confectionery delivery product of claim 1, wherein an exterior surface of the cover is molded or printed with the likeness of a face of any one of a human, an animal, or a cartoon character.

18. The multiple component confectionery delivery product of claim 1, wherein the neck is cylindrical.

19. A resealable confectionery product for delivery of a liquid confectionery onto an outer surface of a solid confectionery, the resealable confectionary product comprising:
a compressible liquid chamber housing a liquid confectionery, said compressible liquid chamber including an open end defined by a neck having a threaded exterior surface, compressible chamber walls, and a base;
a collared lid, having an interior threaded surface to be matably engageable with said exterior surface of said compressible liquid chamber neck, a solid confectionery mounting element defining a first select configuration, and a dispensing aperture to provide fluid communication with the interior of the compressible liquid chamber when the collared lid is engaged with said compressible liquid chamber neck;
a solid confectionery with a mounting base and a liquid confection receiving surface, said mounting base dimensionally conforming to said first select configuration to establish an interference fit to said solid confectionery mounting element; a cover dimensioned and conformed to sealably engage with an exterior surface of said collared lid, and overlie the solid confectionery, said cover having formed integrally thereon a plug member conformed for insertion into the dispensing aperture and obstruct fluid communication with the interior of the compressible liquid chamber when the cover is engaged with the collared lid to reseal the dispensing aperture and solid confectionery and prevent delivery of said liquid confectionery.

* * * * *